April 12, 1938.     E. C. ANDROSKY     2,113,957
PNEUMATIC TIRE PRESSURE SIGNALING DEVICE
Filed Nov. 2, 1937
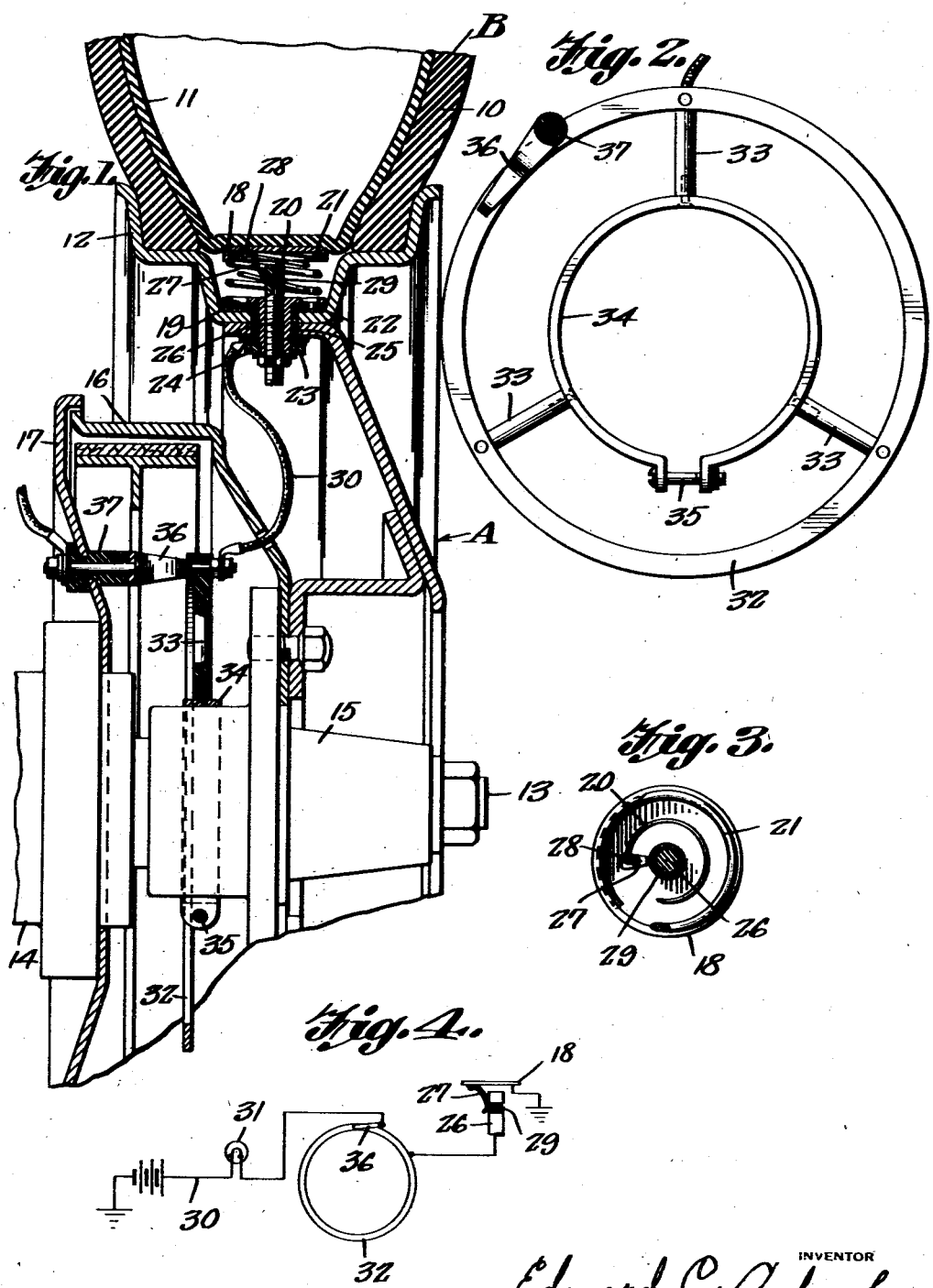
INVENTOR
Edward C. Androsky Patented Apr. 12, 1938

2,113,957

UNITED STATES PATENT OFFICE 2,113,957

PNEUMATIC TIRE PRESSURE SIGNALING DEVICE

Edward C. Androsky, Superior, Wis., assignor of fifty percent to Frank Androsky, Superior, Wis.

Application November 2, 1937, Serial No. 172,418

2 Claims. (Cl. 200—58)

The invention relates to a pneumatic tire pressure signaling device and more particularly to an indicating device for association with motor vehicle tires.

The primary object of the invention is the provision of a device of this character, wherein the same is built in the wheel of a motor vehicle so as to function with the tire of the pneumatic type for effecting a signal indicative of variations in the pressure within the inner tube of the tire and in this manner enabling an operator of the motor vehicle to know the condition, that is to say, the pressure condition of the tire particularly when the pressure is dangerously low or in excess of the required pressure.

Another object of the invention is the provision of a device of this character, wherein the construction thereof is novel in its entirety and is susceptible of mounting within the standard makes of vehicle wheels for association with the inner tube of a tire of the pneumatic type and assures the automatic signaling of the pressure condition when high or low with respect to a predetermined amount therein.

A further object of the invention is the provision of a device of this character, which is simple in its construction, thoroughly reliable and efficient in operation, automatic in the working thereof, readily and easily built into the vehicle wheel, strong, durable and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a fragmentary vertical transverse sectional view through a vehicle wheel and pneumatic tire showing the device constructed in accordance with the invention installed.

Figure 2 is an elevation of the wiper contact ring and wiper associated therewith involved in the device.

Figure 3 is a fragmentary detail sectional view through the switch employed in the device.

Figure 4 is a fragmentary diagrammatic plan view of the circuit arrangement employed with the device.

Similar reference characters indicate corresponding parts throughout the several views in the drawing.

Referring to the drawing in detail, A designates a portion of the rotatable wheel for a motor vehicle and B the pneumatic tire which involves as usual the outer shoe 10 and inflatable inner tube 11, respectively, these being upon the rim 12 of the wheel A. As usual the wheel A rotates upon an axle spindle 13 of an axle 14, the hub of the said wheel being indicated at 15 and carries a brake drum 16 which is closed at its inner open side by a closure disk 17 fixed to the axle 14 which is stationary.

The device comprises a separated substantially circular shaped cupped element 18 and washer 19. having interposed therebetween inside and outside concentrically arranged compressible coil springs 20 and 21, respectively, so that the cup shaped element 18 will yield relative to the washer 19. The washer 19 is counterseated at 22 centrally in the rim 12 and is held fast thereto by a locking sleeve 23 which is passed through a central clearance in the said washer 19 and the rim 12 and carries a lock nut 24 while about this sleeve is an insulating bushing 25 for insulating it from the wheel A. The cup shaped element 18 plays against the tube 11 within the casing 10 and this tube is inflated to a determined pounds pressure as required in the servicing of the tire.

Adjustably threaded in the sleeve 23 is a shiftable contact 26 with which is engageable a spring contact 27 made fast at 28 to the cup shaped element 18 and normally seats against an insulator ring 29 counterseated concentrically in the contact 26, the latter with the contact 27 constitutes a switch within an electric circuit 30 having included therein an illuminating electric lamp signal 31, this circuit 30 being a part of the electric wiring system of a motor vehicle and it is preferable to have the lamp signal 31 present at the cowl or dash of such vehicle to be clearly visible to an operator thereof.

Arranged within the circuit 30 is an annular wiper contact ring 32 spoked at 33 with a split clamping yoke 34 secured at 35 about the hub 15 of the wheel A and engageable with this ring 32 is a wiper contact 36 carried by the closure disk 17 and insulated at 37 therefrom, the ring 32 being insulated from the hub 15 by the insulator spokes 33.

The spring 20 provides a parallel path for the current from the cup shaped element 18 to the rim 12 to assure of positive closing of the circuit when the cup shaped element 18 and the washer 19 approach each other while the contact 27 on approach and separation of the cup shaped element 18 and the washer 19 rides off the insulator ring 29 for positive engagement with the contact 26 and in this manner effecting the closing of the circuit 30 and the illumination of the lamp 31 for signaling purposes. Thus by such operation of the device a warning signal will be given indicating the fact that reduced pressure or excess pressure below or above a determined pounds pressure within the tire tube 11 exists.

On rotation of the wheel A the wiper 36 traverses the ring 32 and has unbroken continuous contact therewith. When the contact 27 engages the insulator ring 29, the circuit 30 is open and the lamp 31 unlighted. When the contact 27 engages directly with the contact 26 by leaving the insulator ring 29 the circuit 30 automatically closes and the lamp 31 becomes lighted issuing a signal of a variance in the pressure condition within the tube 11 in the tire casing 10 of the tire B.

What is claimed is:

1. In a switching device of the kind described for a rotatable wheel having a rim and inflated tire thereon, a metal sleeve extending through an opening in the wheel rim and insulated therefrom, a spring seat surrounding said sleeve and supported on the said rim between the rim and the inner tube, a compressible coiled spring positioned in the said spring seat and extending between the rim and the inner tube, a cup shaped element supported on the end of said coiled spring and engaging said inner tube, an elongated contact member supported in said sleeve, an insulator ring counterseated concentrically on said elongated contact member, a spring contact mounted on said cup shaped element and arranged to engage said elongated contact element, and normally seated on the said insulator ring whereby any change in pressure in the inner tube beyond limited points will close a circuit.

2. In a switching device of the kind described for a rotatable wheel having a rim and inflated tire thereon, a metal sleeve extending through an opening in the wheel rim and insulated therefrom a spring seat surrounding the said sleeve and supported on the said rim between the wheel and the inner tube, a compressible coiled spring positioned in the said spring seat and extending between the rim and the inner tube, a cup shaped element supported on the end of said coiled spring and engaging said inner tube, a shiftable elongated contact adjustably supported in said sleeve, an insulator ring counterseated concentrically on said elongated contact member, a spring contact mounted on said cup shaped element and arranged to engage said elongated element and normally seated on said insulator ring whereby any change in pressure in the inner tube beyond limited points will close a circuit.

EDWARD C. ANDROSKY.